United States Patent
Smith et al.

(10) Patent No.: US 9,737,910 B2
(45) Date of Patent: Aug. 22, 2017

(54) SIMPLE STRUCTURED ECCENTRIC ASSEMBLY WITH ENHANCED LUBRICATION

(71) Applicant: VOLVO CONSTRUCTION EQUIPMENT AB, Eskilstuna (SE)

(72) Inventors: Howard Smith, Shippensburg, PA (US); Edward Magalski, Spring Grove, PA (US); Petar Milkovic, Shippensburg, PA (US); Aman Mahajan, Shippensburg, PA (US)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 15/117,900

(22) PCT Filed: Feb. 10, 2014

(86) PCT No.: PCT/US2014/015527
§ 371 (c)(1),
(2) Date: Aug. 10, 2016

(87) PCT Pub. No.: WO2015/119631
PCT Pub. Date: Aug. 13, 2015

(65) Prior Publication Data
US 2017/0014867 A1    Jan. 19, 2017

(51) Int. Cl.
*E01C 19/00* (2006.01)
*B06B 1/16* (2006.01)
(Continued)

(52) U.S. Cl.
CPC .............. *B06B 1/16* (2013.01); *B06B 1/162* (2013.01); *E01C 19/286* (2013.01); *F16C 33/6662* (2013.01)

(58) Field of Classification Search
CPC ....... B06B 1/16; E01C 19/286; F16C 33/6662
(Continued)

(56) References Cited

U.S. PATENT DOCUMENTS 4,561,319 A * 12/1985 Lilja ..................... F16C 3/18
                                                        404/117
4,568,218 A    2/1986 Orzal
(Continued)

FOREIGN PATENT DOCUMENTS

CN    2292832 Y    9/1998
CN    102383361 A    3/2012

OTHER PUBLICATIONS

International Search Report for Application No. PCT/US2014/015527 dated Nov. 26, 2014.

*Primary Examiner* — Raymond W Addie
(74) *Attorney, Agent, or Firm* — Lerner, David, Littenberg, Krumholz & Mentlik, LLP

(57) ABSTRACT

An eccentric assembly for a compaction machine comprises an outer eccentric member that is longitudinally elongated cylinder shaped and has a partial longitudinal opening through the length; an inner eccentric member that is longitudinally elongated cylinder shaped and has a partial longitudinal opening through the length and rotatably connected inside of said outer eccentric member so that the inner eccentric member can rotate with respect to the outer eccentric member around the same axis of rotation.

15 Claims, 4 Drawing Sheets

(51) Int. Cl.
*E01C 19/28* (2006.01)
*F16C 33/66* (2006.01)

(58) Field of Classification Search
USPC .................................... 404/113, 117, 84.05
See application file for complete search history.

(56) References Cited

U.S. PATENT DOCUMENTS

| | | | | |
|---|---|---|---|---|
| 4,632,599 | A * | 12/1986 | Sadahiro | E01C 19/236 404/121 |
| 4,749,305 | A * | 6/1988 | Brown | E01C 19/286 366/116 |
| 8,206,061 | B1 * | 6/2012 | Hansen | E01C 19/286 404/128 |
| 8,967,910 | B2 * | 3/2015 | Hansen | E01C 19/286 404/113 |
| 9,334,621 | B2 * | 5/2016 | Persson | F16C 3/18 |
| 2003/0021629 | A1 | 1/2003 | Swanson et al. | |

* cited by examiner

SIMPLE STRUCTURED ECCENTRIC ASSEMBLY WITH ENHANCED LUBRICATION

CROSS-REFERENCE TO RELATED APPLICATION

This application is a national phase entry under 35 U.S.C. §371 of International Application No. PCT/US2014/015527 filed Feb. 10, 2014, published in Korean, the disclosure of which is incorporated herein by reference.

TECHNICAL FIELD

The present disclosure relates to a construction machine, in particular, relates to a simple structured eccentric assembly with enhanced lubrication, for a construction machine.

BACKGROUND OF THE INVENTION

Construction machines, especially compaction machines, usually include a frame and one or two vibrating drums rotatably mounted to the frame, whereby the drums compact the surfaces as the machine moves thereon. Compacting machines often include a vibration assembly that generates vibrations and transfer these vibrations via the drum to the work surface. These eccentric assemblies are used to provide vibratory impact for compaction and also sometimes for oscillation effects for some types of compaction machines. Usually a vibration assembly for compaction machines has two eccentric weights that are adjustable relative to each other to vary the amplitude of the vibrations that are generated by rotating the eccentric assembly.

SUMMARY OF THE INVENTION

In order to achieve the aforementioned objectives, the present invention employs the following arrangement.

According to one aspect of the present disclosure, the present disclosure provides an eccentric assembly for vibratory compaction comprising: an outer eccentric member that is longitudinally elongated cylinder shaped and has a partial longitudinal opening through the length; and an inner eccentric member that is longitudinally elongated cylinder shaped and has a partial longitudinal opening through the length and rotatably connected inside of said outer eccentric member so that the inner eccentric member can rotate with respect to the outer eccentric member around the same axis of rotation.

It is preferable that a pin member that fitted into the bores of the inner eccentric member and outer eccentric member thus rotatably connects said inner eccentric member and said outer eccentric member together.

It is also preferable that bushings that are press fitted between the inner eccentric member and said pin member so that the bushings give enough friction to the inner eccentric member to rotate with respect to the outer eccentric member.

It is also preferable that a snap ring fitted at the inner eccentric member side end of the pin member so that the pin member does not move away.

It is also preferable that thrust washers on the pin member between the inner eccentric member and the outer eccentric member and between said snap ring and said inner eccentric member so that the friction between the elements can be absorbed by the washers.

It is also preferable that the outer eccentric member and said inner eccentric member overlaps downward in high amplitude position and said inner eccentric member rotates upward not to overlap much in low amplitude position.

It is also preferable that bearings connected to the outer ends the outer eccentric member at the same axis of rotation with the outer eccentric member and the inner eccentric member.

It is also preferable that the bearings are directly connected to the outer ends of the outer eccentric member without journals so that oil flows easily into the rolling part of the bearings without interference of the journals.

It is also preferable that the inner surface of the outer eccentric member works as a stopper so an additional stopper for the inner eccentric member is not needed.

It is also preferable that at least one protruded stopper for the inner eccentric member at the inner surface of the outer eccentric member so that wear to the outer eccentric member is minimized.

According to another aspect of the present disclosure, the present disclosure discloses an eccentric assembly for a compaction machine comprising: an outer eccentric member that is longitudinally elongated cylinder shaped and has a partial longitudinal opening through the length; an inner eccentric member that is longitudinally elongated cylinder shaped and has a partial longitudinal opening through the length and rotatably connected inside of said outer eccentric member so that the inner eccentric member can rotate with respect to the outer eccentric member around the same axis of rotation; and bearings connected to the outer ends the outer eccentric member at the same axis of rotation with the outer eccentric member and the inner eccentric member.

It is preferable that the bearings are directly connected to the outer ends of the outer eccentric member without journals so that oil flows easily into the rolling part of the bearings without interference of the journals.

It is also preferable that a pin member that fitted into the bores of the inner eccentric member and outer eccentric member thus rotatably connects said inner eccentric member and said outer eccentric member together.

It is also preferable that bushings that are press fitted between the inner eccentric member and said pin member so that the bushings give enough friction to the inner eccentric member to rotate with respect to the outer eccentric member.

It is also preferable that a snap ring fitted at the inner eccentric member side end of the pin member so that the pin member does not move away.

It is also preferable that thrust washers on the pin member between the inner eccentric member and the outer eccentric member and between said snap ring and said inner eccentric member so that the friction between the elements can be absorbed by the washers.

It is also preferable that the outer eccentric member and said inner eccentric member overlaps downward in high amplitude position and said inner eccentric member rotates upward not to overlap much in low amplitude position.

It is also preferable that the inner surface of the outer eccentric member works as a stopper so an additional stopper for the inner eccentric member is not needed.

It is also preferable that at least one protruded stopper for the inner eccentric member at the inner surface of the outer eccentric member so that wear to the outer eccentric member is minimized.

DETAILED DESCRIPTION OF THE INVENTION

Figure 1:
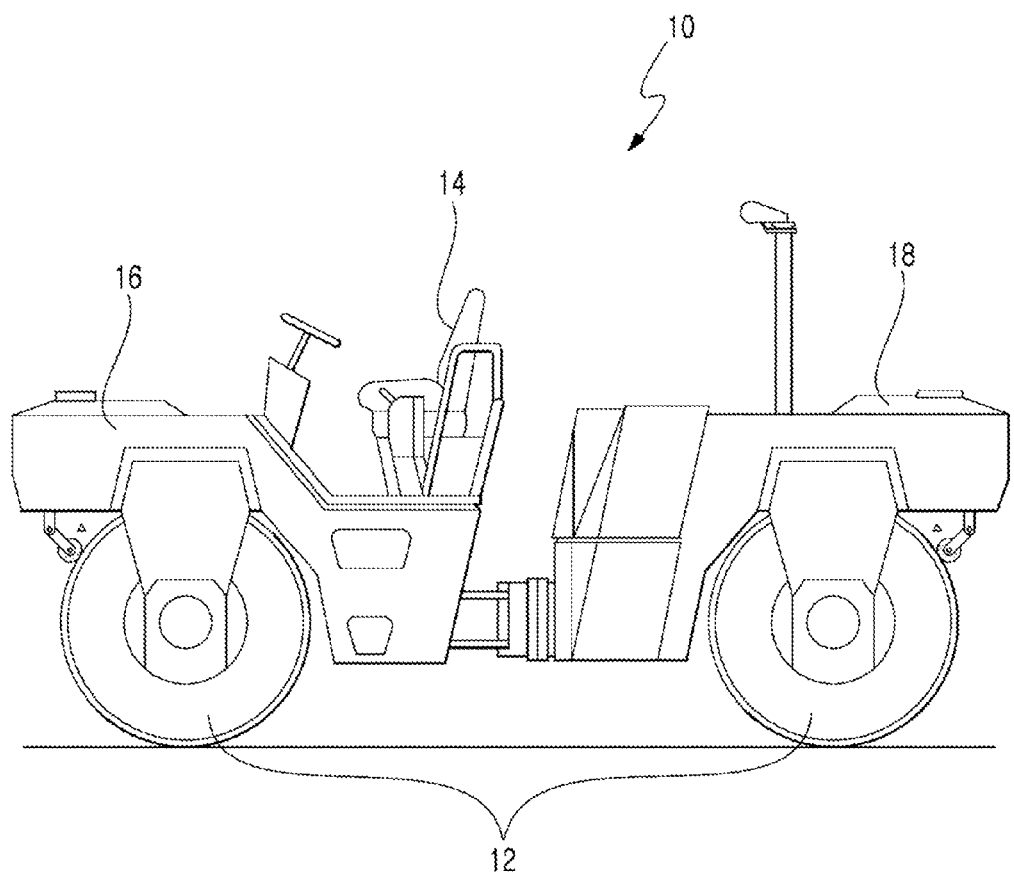
FIG. 1 illustrates a perspective view of a compactor machine according to prior arts.

While this invention is illustrated and described in a preferred embodiment, the device may be produced in many different configurations, forms and materials. There is depicted in the drawings, and will hereinafter be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Figure 2:
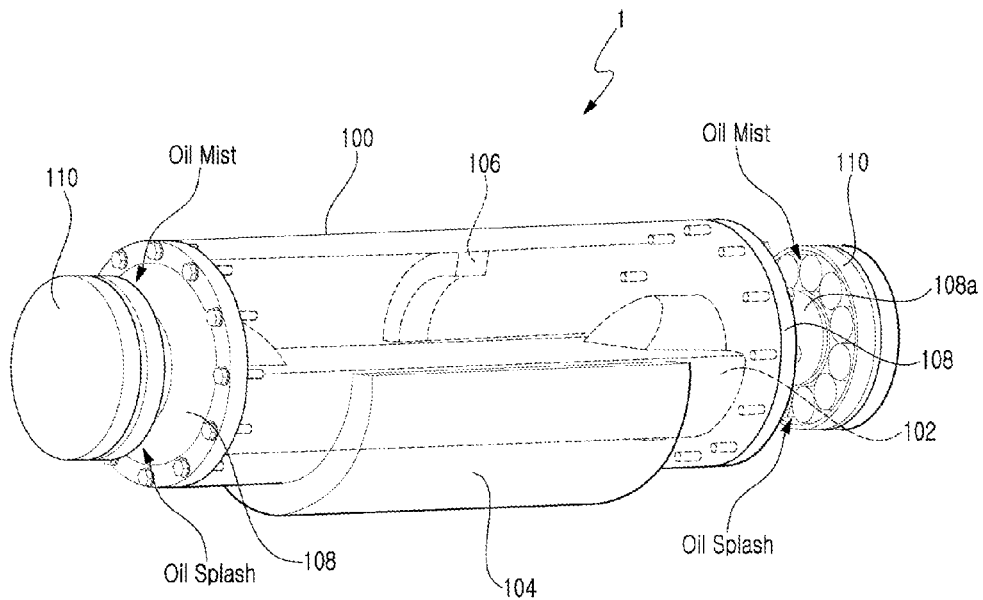
FIG. 2 illustrates a perspective view of an eccentric assembly according to prior arts.
Figure 3:
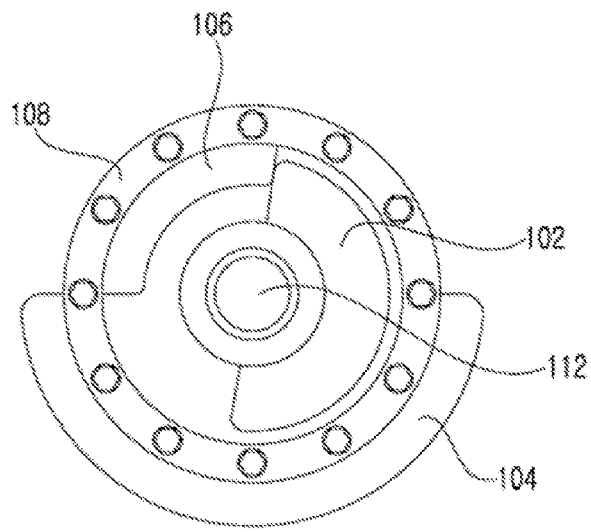
FIG. 3 shows a cross-sectional view of the eccentric assembly according to FIG. 2.

Referring to FIGS. 1-3, the present disclosure describes an eccentric assembly according to prior arts.

Compacting machines usually have at least one roller or drum 12 and drum frames 16, 18 to control and move the vehicle along with the drums 12. There is an operator's platform 14 for the operator on top of the vehicle. A compacting machine 10 usually has at least one vibratory eccentric assembly in a drum 12 which used to compact the grounds. These eccentric assembly 100 is usually have an outer eccentric member 104, inner eccentric member 102, a mechanical stopper 106, journals 108 coupling the outer eccentric member 104 and the inner eccentric member 102 together at the end of the outer eccentric member 104, and a bearing 110 at the outer ends of the journals 108.

The outer eccentric member 104 is a rigid cylinder having added thickness around the lower part of it. The added thickness works as a mass so it can have eccentric mass that is lighter at one part and heavier at the other part. The shape of the added thickness can be varied but in this prior art, it is a half cylinder located partially on the lower part of the outer eccentric member 104. At the upper part of the outer eccentric member 104, there is a stopper 106 to mechanically stop the rotation of the inner eccentric member 102. In the prior art, the stopper 106 is quarter arc shaped bar protruded toward inside of the outer eccentric member 104 with a small thickness so that it can prevent the movement of the inner eccentric member 102. However, the weight of the stopper 106 is not substantial enough to prevent the outer eccentric member 104 from working as eccentric member since the additional mass of the outer eccentric member 104 is much larger than that of the stopper 106.

The inner eccentric member 102 is rotatably connected to the axis of the rotation. In this prior art, it is almost a half cylinder shaped with slighter protrusion on each end sides so that the inner eccentric member 102 can be securely fastened to the axis of rotation. FIG. 3 shows how the inner eccentric member 102 can rotate and stopped by the stopper 106. When the inner eccentric member 102 rotates to the bottom, the mass of the inner eccentric member 102 can be added to the eccentric mass of the outer eccentric member 104 at the bottom. Thus, the drums 12 of the compaction machine can provide high amplitude vibration to the work surface. When the inner eccentric member 102 rotates upward as shown in FIG. 3, the mass of the eccentric assembly 100 is dispersed. Thus, the drums 12 of the compaction machine will provide low amplitude vibration to the work surface.

The end of the outer eccentric member 104 and the inner eccentric member 102, there are journals 108 that can seal and support the eccentric members 102, 104. The journals 108 would also connect the inner eccentric member 102 to bearings 110 so that the friction would be handled by the bearings 110. However, as shown in FIG. 2, the presence of the journals 108 would limit l$_{[HS1]}$ lubrication oil mist or splash from reach well to the balls of the bearings 110. Bearings 110 can be ball bearings or any type of bearings that can facilitate rotation and minimize friction.

Figure 4:
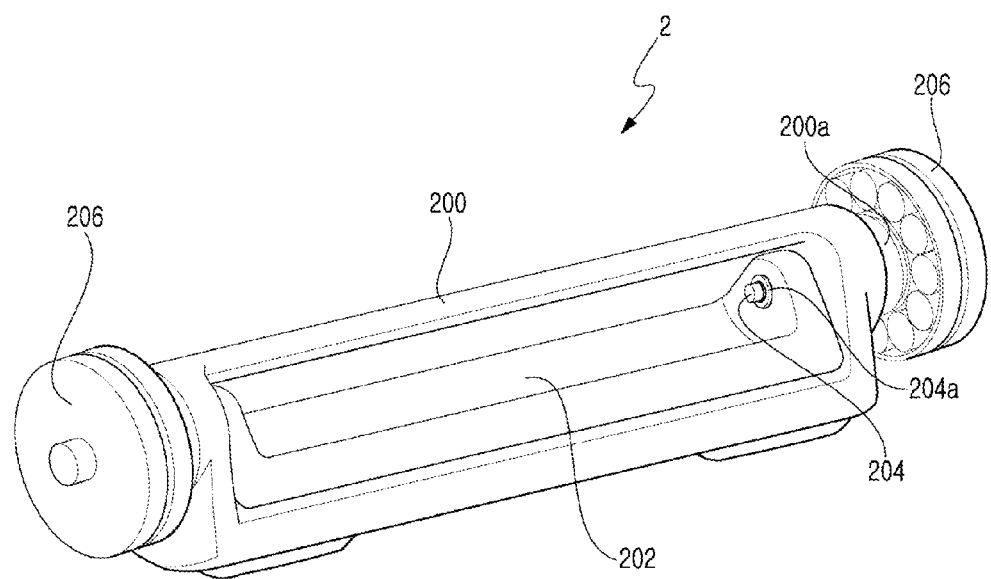
FIG. 4 shows a perspective view of the eccentric assembly according to the present disclosure, when it is in high amplitude.
Figure 5:
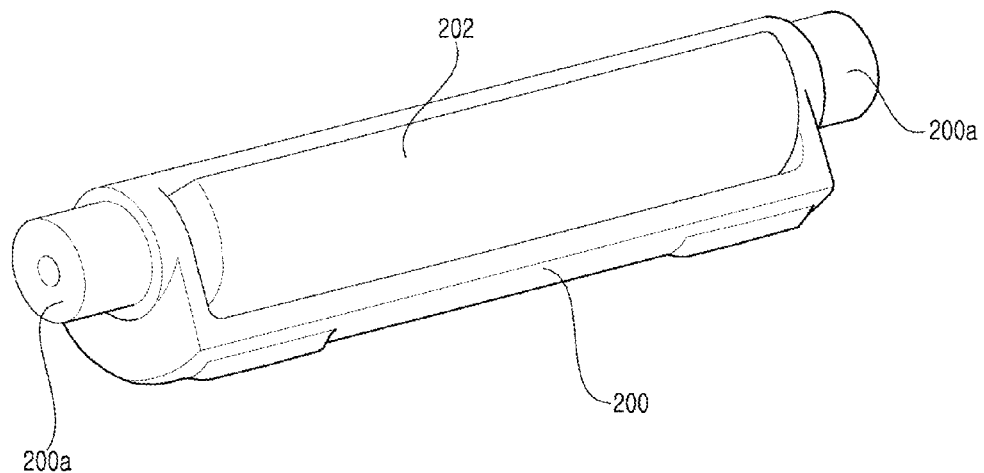
FIG. 5 shows a perspective view of the eccentric assembly according to the present disclosure, when it is in low amplitude.

Referring to FIGS. 4 and 5, the eccentric assembly according to the present disclosure is explained, when it is in high amplitude and low amplitude.

The eccentric assembly 2 according to the present disclosure has much simpler structure than that of the prior arts explained above. The outer eccentric member 200 shaped as an open cylinder which has approximately half circle as its cross section, although it does not have to be a half circle but a cylinder having some open space so that the inner eccentric member 202 can be located into and rotate in it. The outer eccentric member 200 has its protrusion parts 200a at each end of it. The protrusion parts 200a can be fastened with the bearings 206 so that the inner eccentric member 204 can rotate with respect to the outer eccentric member 200. Detailed structure of fastening will be explained later when referring to FIG. 5.

The inner eccentric member 202 is shaped as approximately quarter-arced open cylinder which can be rotatably fastened inside the outer eccentric member 200. FIG. 4 shows the outer eccentric member 200 and the inner eccentric member 202 overlaps downward so that they can give high amplitude vibration to the drum. As previously stated, the shape or the arc size of the outer and inner eccentric members 200, 202 can be varying according to the design or specification of a drum or a compactor machine. As shown in FIG. 5, the inner eccentric member 202 rotates with respect to the outer eccentric member 200 so that the mass can be more evenly distributed. In this case, it gives low amplitude vibration to the drum thus impact to the work surface is minimized.

Figure 6:
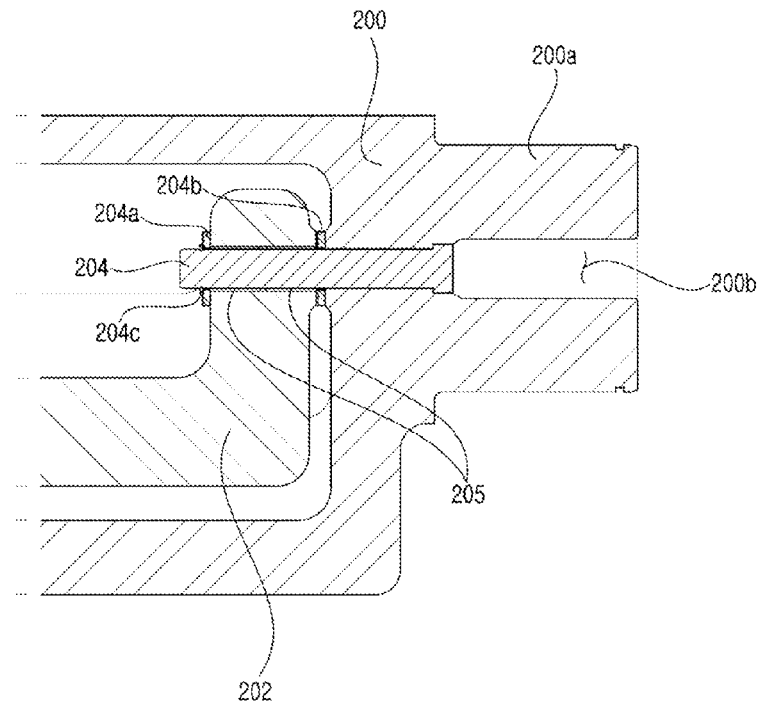
FIG. 6 shows a cross-sectional view of locking state of the eccentric assembly according to the present disclosure.

FIG. 6 shows a cross-sectional view of locking state of the eccentric assembly according to the present disclosure. A pin member 204 press fitted into the bore of the inner eccentric member 202 and extended through the bore of the outer eccentric member 200. The pin member 204 has a stepped end so that it can be fastened to the stepped part of the bore of the outer eccentric 200 and would not moving backward toward the inner eccentric member 202. Also, the pin member 204 is connected to a shaft, which located in the bore 200b and extended outside of the bore 200b, so that it can be rotatably connected to the rotating axis of the bearings 206. In other words, the inner and outer eccentric members 200, 202 are connect together by means of the pin member 204 which is press fitted into the outer eccentric member 200. Bushings 205 are press fitted between the pin member 204 and the inner eccentric member 202, which allow the inner eccentric member 202 to rotate with respect to the outer eccentric member 200. Washers 204a, 204b are located on the pin member 204 on each sides of the inner eccentric member 202. A snap ring 204c is put on pin member 204 adjacent to washer 204a so as to ensure the inner and outer eccentric members 200, 202 do not become separated.

Figure 7:
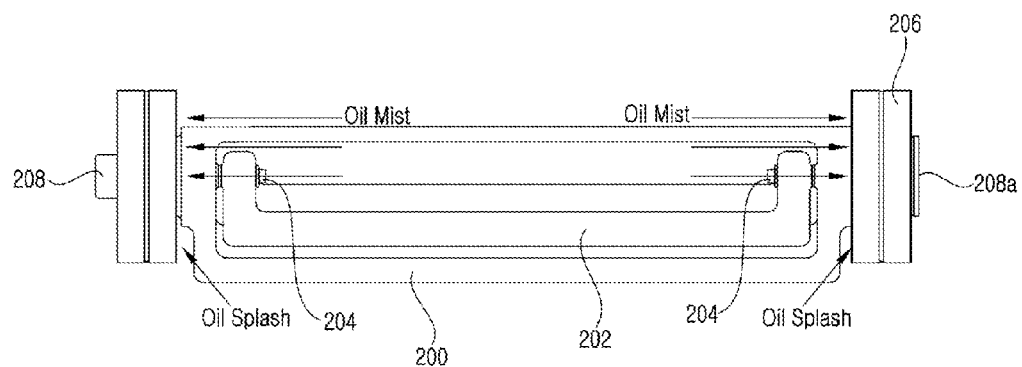
FIG. 7 shows a side view of the eccentric assembly according to the present disclosure.

In referring to FIG. 7, the oil flow and improved lubrication effect according to the present disclosure are explained. The improved lubrication effect is a combination of factors. The first of these is that the oil is struck closer to the eccentric bearing 206 than prior art eccentric assemblies the outer eccentric 200 extends closer to the bearings 206 than in the prior art. The open design according to the present disclosure also creates less of an obstruction in front of the bearing 206 which allows for a more direct path of the oil mist to contact the bearing 206. There is a greater exposed surface area of the bearing 206 which allows for increased lubrication. Thus, the eccentric assembly according to the present disclosure provides simpler construction with higher lubrication efficiency without deteriorating vibration effectiveness. Manufacturing, assembly, or maintenance would be much easier due to the simple structure.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

The invention claimed is:

1. An eccentric assembly for vibratory compaction comprising:
    an outer eccentric member that is longitudinally elongated cylinder shaped and has a partial longitudinal opening through the length;
    an inner eccentric member that is longitudinally elongated cylinder shaped and has a partial longitudinal opening through the length and rotatably connected inside of said outer eccentric member so that the inner eccentric member can rotate with respect to the outer eccentric member around the same axis of rotation;
    a pin member that is fitted into the bores of the inner eccentric member and outer eccentric member thus rotatably connects said inner eccentric member and said outer eccentric member together; and
    bushings that are press fitted between the inner eccentric member and said pin member so that the bushings give enough friction to the inner eccentric member to rotate with respect to the outer eccentric member.

2. The eccentric assembly according to claim 1, further comprising a snap ring fitted at the inner eccentric member side end of the pin member so that the pin member does not move away.

3. The eccentric assembly according to claim 2, further comprising thrust washers on the pin member between the inner eccentric member and the outer eccentric member and between said snap ring and said inner eccentric member so that the friction between the elements can be absorbed by the washers.

4. The eccentric assembly according to claim 1, said outer eccentric member and said inner eccentric member overlaps downward in high amplitude position and said inner eccentric member rotates upward not to overlap much in low amplitude position.

5. The eccentric assembly according to claim 1, further comprising bearings connected to the outer ends the outer eccentric member at the same axis of rotation with the outer eccentric member and the inner eccentric member.

6. The eccentric assembly according to claim 5, said bearings are directly connected to the outer ends of the outer eccentric member without journals so that oil flows easily into the rolling part of the bearings without interference of the journals.

7. The eccentric assembly according to claim 1, wherein the inner surface of the outer eccentric member works as a stopper so an additional stopper for the inner eccentric member is not needed.

8. The eccentric assembly according to claim 1, further comprising at least one protruded stopper for the inner eccentric member at the inner surface of the outer eccentric member so that wear to the outer eccentric member is minimized.

9. An eccentric assembly for a compaction machine comprising:
    an outer eccentric member that is longitudinally elongated cylinder shaped and has a partial longitudinal opening through the length;
    an inner eccentric member that is longitudinally elongated cylinder shaped and has a partial longitudinal opening through the length and rotatably connected inside of said outer eccentric member so that the inner eccentric member can rotate with respect to the outer eccentric member around the same axis of rotation;
    bearings connected to the outer ends the outer eccentric member at the same axis of rotation with the outer eccentric member and the inner eccentric member(;
    a pin member that press fitted into the bores of the inner eccentric member and outer eccentric member thus rotatably connects said inner eccentric member and said outer eccentric member together,
    wherein said bearings are directly connected to the outer ends of the outer eccentric member without journals so that oil flows easily into the rolling part of the bearings without interference of the journals.

10. The eccentric assembly according to claim 9, further comprising bushings that are press fitted between the inner eccentric member and said pin member so that the bushings give enough friction to the inner eccentric member to rotate with respect to the outer eccentric member.

11. The eccentric assembly according to claim 9, further comprising a snap ring fitted at the inner eccentric member side end of the pin member so that the pin member does not move away.

12. The eccentric assembly according to claim 11, further comprising thrust washers on the pin member between the inner eccentric member and the outer eccentric member and between said snap ring and said inner eccentric member so that the friction between the elements can be absorbed by the washers.

13. The eccentric assembly according to claim 9, said outer eccentric member and said inner eccentric member overlaps downward in high amplitude position and said inner eccentric member rotates upward not to overlap much in low amplitude position.

14. The eccentric assembly according to claim 9, wherein the inner surface of the outer eccentric member works as a stopper so an additional stopper for the inner eccentric member is not needed.

15. The eccentric assembly according to claim 9, further comprising at least one protruded stopper for the inner eccentric member at the inner surface of the outer eccentric member so that wear to the outer eccentric member is minimized.

* * * * *